June 14, 1949.  T. E. LENNARD  2,472,952
TRUCK DOLLY
Filed April 10, 1946

INVENTOR.
THOMAS E. LENNARD
BY
ATTORNEY

Patented June 14, 1949

2,472,952

UNITED STATES PATENT OFFICE 2,472,952

TRUCK DOLLY

Thomas E. Lennard, Portland, Oreg.

Application April 10, 1946, Serial No. 661,137

2 Claims. (Cl. 280—35)

This invention relates to that type of truck or dolly which is ordinarily used for moving a heavy article of furniture, such as a couch, desk, refrigerator, etc., manually from room to room, or from place to place on the show room floor, in the store room, and in similar places.

More specifically, this invention relates to truck dollies adapted to support one end of a heavy piece of furniture, or similar load, in such manner that the piece of furniture or other article can be readily and conveniently moved manually by a single person.

One of the objects of this invention is to provide an adjustable dolly, of the type above mentioned, suitable for pieces of furniture or other heavy articles, of various sizes, which will be small, compact, and easy to use.

Another object of this invention is to provide such a dolly on which the article being moved can be tilted upwardly without danger of tipping or overbalancing the dolly and on which the weight of the article on the dolly will always be properly positioned.

An additional object is to provide a simple, practical and inexpensive dolly which will offer suitable protection to the article of furniture resting on the dolly.

These objects and incidental advantages I attain by constructing my improved furniture truck dolly in the manner hereinafter briefly described. In the following description reference is made to the accompanying drawings in which:

In Fig. 2 an article of furniture is shown in broken lines to illustrate the manner in which the dolly is employed.

Figure 1:
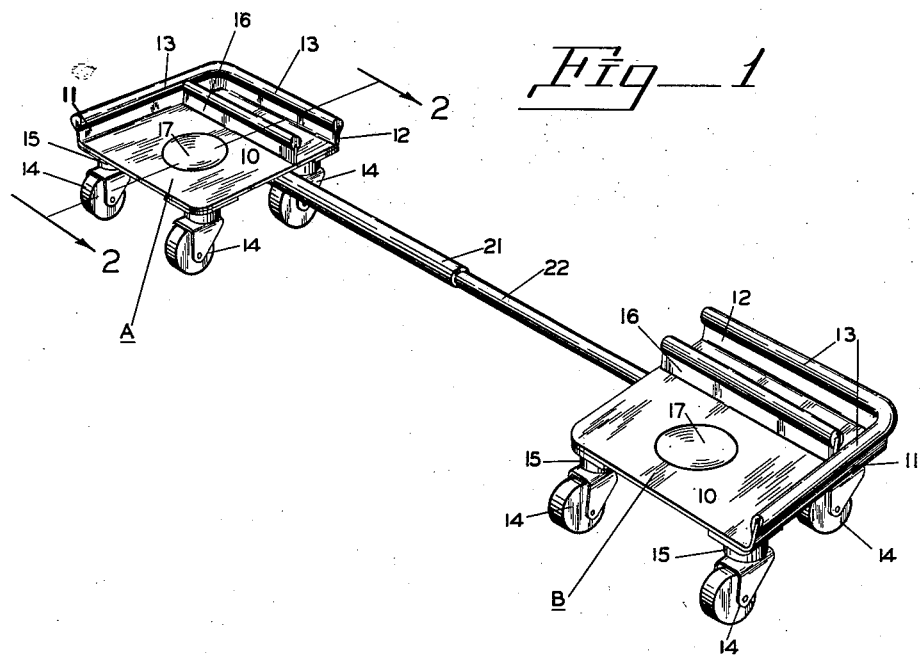
Fig. 1 is a perspective view of my furniture truck dolly.

Referring first to Fig. 1, my improved dolly comprises a pair of companion truck elements, designated in general by the reference characters A and B, which are substantially similar and which are adjustably connected and positioned with respect to each other by adjustable connecting means, such as the telescoping members 21 and 22. Each truck element A and B has a main horizontal flat bed frame 10, preferably rectangular in shape, with upstanding vertical flanges 11 and 12 on two of its sides, as shown. The flanges 11 are located at the outside opposite edges of the two truck elements respectively. The flanges 12 are both located at the front sides of the truck elements. The upper edges of these flanges are covered with a roll 13 of soft, protective material, such as rubber, to avoid damage to woodwork, walls or furniture upon contact with the dolly.

The main frame 10 of each truck element is preferably supported on four casters 14 which are mounted in the usual swivel caster bearings 15 located at the corners of the main frame in the customary manner.

On each truck element an inner, upwardly extending flange 16 is secured to the main frame and extends parallel to the front flange 12. This inner flange 16 similarly is provided with a soft, protective covering over its top edge. These inner flanges are important features of my dolly, their purpose being hereinafter explained. The flat bed frame 10 is preferably formed with depression 17, centrally located in the space defined by the flanges 11 and 16, as a further aid in the proper positioning of the load on each truck element.

The two truck elements A and B are adjustably connected together so that they may be positioned the proper distance apart to accommodate the opposite forward corners or ends of the article of furniture which is to be moved. For such adjustable connecting means I have found it convenient to use the tubular telescoping members 21 and 22, welded or otherwise secured to the bottom faces of the bed frame of the truck elements A and B respectively.

Figure 2:
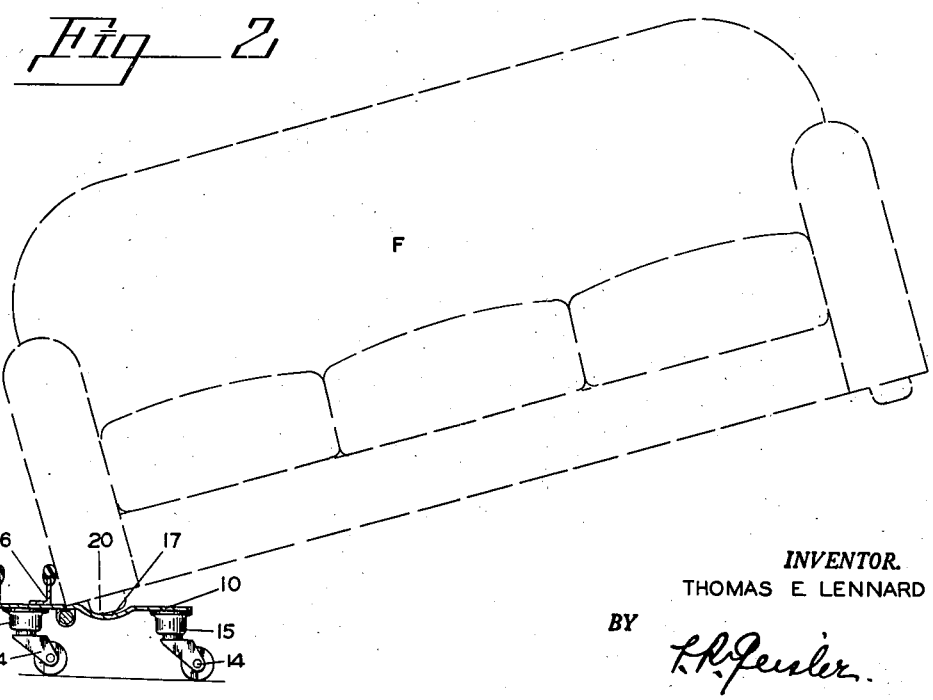
Fig. 2 is a sectional view, taken on line 2—2 of Fig. 1.

Referring now to Fig. 2, let it be assumed that it is desired to move a couch F by means of my dolly. One end of the couch is placed on the dolly after the two truck elements have been properly arranged so that the two forward corner floor rests 20 of the couch will rest upon the central portions 17 of the two truck elements. The opposite end of the couch can then be lifted to any comfortable carrying height by the person doing the moving and the couch and dolly then pushed around like a wheelbarrow. With an ordinary dolly this tilting of the couch would have a tendency to tilt the dolly also, with the result that some of the dolly caster wheels would be lifted from the floor and there would also be a tendency for the couch to slip off of the dolly. However, with my improved dolly, the inner flange 16 prevents any possibility of the weight load on each truck element from being positioned beyond, or even over, the forward caster wheels, so that there is no tendency for any tipping or over-balancing of the truck elements. The front flanges 12, being positioned ahead of the bottom of the couch, also protect the upper part of the couch from inadvertent contact with a wall or other objects as the couch is wheeled forward.

It would be possible to make minor modifications in my dolly without departing from the principle of my invention. Thus the outer protective guards or flanges 11 and 12 could be differently constructed and the inner guard or flange 16 could also be differently constructed. It is essential with my invention, however, that some inner guard or positioning guide means be provided and that this be in such location that the center of gravity of the load on the truck elements will always be to the rear of the front wheels. Still further modifications in construction and form could be made, but the form in which I have shown my dolly I consider to be preferable since I have found this to be very satisfactory and practical.

I claim:

1. In a dolly of the character described, a truck element, said truck element having a main frame substantially horizontal throughout the major portion of the frame, an upstanding flange extending upwardly from a portion of the outer edge of said main frame, a cushioning protective element on said flange, a similar upstanding inner flange extending upwardly from said main frame substantially parallel to a portion of said first mentioned outer flange and located between the center of said main frame and said last mentioned portion of said outer flange, a plurality of swivel-mounted casters secured to the underside of said frame, two of said casters being located below the space between said inner and outer flanges and a depression in the center portion of said frame.

2. A dolly of the character described comprising a pair of substantially similar truck elements, adjustable telescoping means connecting said pair of elements, each of said truck elements having a main frame extending substantially horizontally, an upstanding guard extending upwardly from a portion of the outer edge of said main frame, a similar upstanding inner guard extending upwardly from said main frame substantially parallel to a portion of said first mentioned outer guard and located between the center of said main frame and said last mentioned portion of said outer guard, a plurality of wheels secured to the underside of said frame, at least one of said wheels being located below the space between said inner and outer guards.

THOMAS E. LENNARD.

REFERENCES CITED

The following references are of record in the file of this patent:

UNITED STATES PATENTS

| Number | Name | Date |
|---|---|---|
| 429,657 | Spivey | June 10, 1890 |
| 808,738 | Fischer | Jan. 2, 1906 |
| 1,322,719 | Nelson | Nov. 25, 1919 |
| 1,666,139 | Johnson | Apr. 17, 1928 |
| 2,220,160 | Kriger | Nov. 5, 1940 |
| 2,277,787 | Scott | Mar. 31, 1942 |

FOREIGN PATENTS

| Number | Country | Date |
|---|---|---|
| 526,067 | Great Britain | Sept. 10, 1940 |